March 23, 1937.  C. R. BOGGS  2,074,826
HIGH TENSION RUBBER INSULATION
Filed May 21, 1932
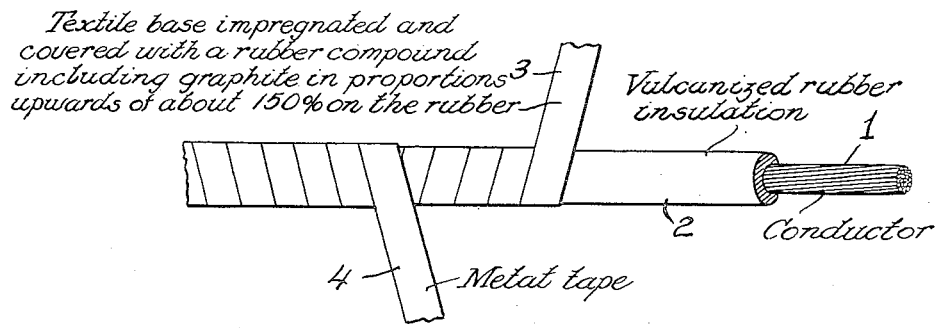
INVENTOR
Charles R. Boggs
BY
ATTORNEYS Patented Mar. 23, 1937

2,074,826

UNITED STATES PATENT OFFICE 2,074,826

HIGH TENSION RUBBER INSULATION

Charles R. Boggs, Waban, Mass., assignor to Simplex Wire & Cable Company, Boston, Mass., a corporation of Massachusetts Application May 21, 1932, Serial No. 612,859

7 Claims. (Cl. 173—264)

This invention relates to improvements in the application of vulcanized rubber as insulation for high voltage service. The invention includes improved rubber insulated conductors and improved conducting coverings for protecting vulcanized rubber insulation.

Vulcanized rubber insulation possesses some qualities which are ideal for high voltage insulation. It has high dielectric strength. It is flexible. It can be made to conform to extreme limits of uniformity. It can expand, contract and flex without the formation of air pockets. It can be made to have extremely long life. In spite of these qualities, however, vulcanized rubber insulation has generally been considered unsuitable for insulation at voltages, conductor to ground, above 12,000. For operation at higher voltages, impregnated paper insulation is usually used.

Vulcanized rubber insulation has been considered unsuitable for high voltage operation because ozone, formed as the result of corona discharge through air spaces adjacent the rubber insulation due to excessive voltage stress across such air spaces, induces rapid oxidation and deterioration of the rubber insulation resulting in "corona cutting" and consequent electrical breakdown. Any air space, air pocket or air film adjacent the rubber insulation is a potential source of ozone formation and insulation failure in high voltage operation. Corona cutting is not usually experienced with cables carrying less than about 5,000 volts.

Proposals to overcome this limitation of vulcanized rubber insulation have included proposals to protect the rubber insulation with a conducting covering relieving the voltage stress at the surface of the vulcanized rubber insulation. The conducting coverings hitherto proposed have included metal tapes, braids and jackets and metallized papers and textiles. Such application of these conducting coverings hitherto proposed have been subject to practical limitations with respect to perfection of the protection. A local failure, as well as a general failure, precludes successful operation, and these conducting coverings hitherto proposed have not been successfully applied to eliminate all air spaces adjacent the surface of the vulcanized rubber insulation. Flexing of an insulated conductor, for example, tends to form air spaces between these conducting coverings hitherto proposed and the surface of the vulcanized rubber insulation. Any one such air space may cause failure.

The improved conducting covering of this invention comprises a textile base impregnated and covered with a rubber compound including graphite in proportions upwards of about 150% by weight on the rubber. Rubber compounds, consisting essentially of rubber and graphite, containing upwards of about 150% by weight of graphite on the rubber have sufficient conductance to relieve the voltage stress at the surface of rubber insulation to which they may be applied to prevent the formation of ozone at any voltage that may be applied up to that voltage corresponding to the maximum dielectric strength of the vulcanized rubber insulation, over areas larger than that of air spaces adjacent the surface of the vulcanized rubber insulation normally occurring beneath conventional conducting sheaths. Such compounds containing as much as 400% of graphite on the rubber, for example, can be prepared. Since repeated bending of the cable greatly increases the resistance of the conducting compound, percentages of graphite less than about 150 do not always prove satisfactory in practice, even though undisturbed samples may seem to be satisfactory in certain laboratory tests. Impregnation of the textile base with the conducting rubber compound is important to secure adequate conductance through the base, and covering of the base is important to secure adequate conductance along the surfaces of the base. The textile base acts as a reinforcement to strengthen the conducting compound. Such textile base impregnated and covered with a conducting rubber compound is easily and conveniently applied to the rubber insulation as a protective covering or layer, in the form of a tape for example. The conducting layer of the invention is applied in direct contact with the rubber insulation to be protected. The conducting compound with which the base is impregnated and covered, being a rubber compound, is closely adherent to the rubber insulation and resists such displacement as commonly forms air spaces beneath conventional conducting coverings. The conductivity of the conducting layer of the invention is, as will be apparent, not unlimited, but any of the conventional highly conductive coverings, a lead jacket or a copper or brass tape for example, may be applied as a conducting sheath over the conducting layer of the invention, thus continuously grounding the conducting layer to a sheath having much greater conductivity. This leaves to the conducting layer of the invention only that part of the burden of relief of voltage stress existing in the comparatively small areas where the conducting layer happens to be not in direct contact with the conducting sheath. The conducting layer itself forms a continuously adherent flexible conducting covering in direct contact with the rubber insulation to be protected, and thus no air spaces can be formed between the outside surface of the insulation and the conducting layer.

The conducting covering of the invention may be applied to the rubber insulation to be protected before or after that rubber insulation has been vulcanized, and the rubber compound of the conducting covering may be vulcanized before or after application to the rubber insulation to be protected. To assure that the conducting layer and the insulation may permanently remain in intimate contact, it is particularly advantageous to apply the conducting layer of the invention to the rubber insulation to be protected before either the rubber insulation or the rubber compound of the conducting layer has been vulcanized and then to vulcanize the two together. It is advantageous to apply the conducting layer to the rubber insulation before at least one or the other of the rubber compounds, the rubber insulation and the rubber compound of the conducting layer, has been vulcanized and thereafter to vulcanize one or both of the rubber compounds.

The following examples of rubber compounds for impregnating and covering the base of the improved conducting layer of the invention will illustrate the invention:

*Compound 1*

300 parts smoked sheets, 700 parts graphite, 15 parts zinc oxide, 6 parts sulphur, 3 parts alphanaphthylamineacetaldol, ¾ part tetramethylthiuramdisulphide.

*Compound 2*

400 parts smoked sheets, 600 parts graphite, 20 parts zinc oxide, 8 parts sulphur, 4 parts alphanaphthylamineacetaldol, 1 part tetramethylthiuramdisulphide.

Parts in the foregoing compounds are parts by weight. A textile base impregnated and covered with the foregoing compounds, may be vulcanized for forty minutes at 260° F. for example.

The textile base of the conducting layer of the invention may be impregnated and covered with the conducting rubber compound including a high proportion of graphite before the latter is vulcanized in a calender in the conventional manner of impregnating and covering textiles with conventional rubber compounds. The improved conducting layer of the invention is useful in the protection of any conventional vulcanized rubber insulation.

The improved insulated electrical conductor of the invention comprises a conductor and vulcanized rubber insulation thereon, and the improved conducting layer of the invention applied over and in direct contact with this vulcanized rubber insulation. The rubber insulation on the conductor may be of any conventional type and may be applied and vulcanized in any conventional manner. As previously noted, the vulcanization of this rubber insulation may be carried out before or after vulcanization of the rubber compound of the applied conducting layer. The improved insulated electrical conductor of the invention also comprises, with advantage, a conducting sheath, such as a lead jacket or a winding of copper or brass tape, over and in contact with the conducting layer of the invention. Insulated conductors embodying the invention can be incorporated in the conventional manner in any conventional cable construction.

A fragment of an insulated electric conductor embodying the invention, with parts removed, is illustrated in the accompanying drawing, in which the conductor is designated 1, the vulcanized rubber insulation on the conductor is designated 2, the conducting layer comprising a textile base impregnated and covered with a rubber compound including graphite in proportion upwards of about 150% by weight on the rubber is designated 3 and the conducting sheath, a highly conductive metal tape, over and in direct contact with the conducting layer, is designated 4.

The invention makes possible the utilization of a radically increased proportion of the dielectric strength, approaching the full dielectric strength as a limit, of the vulcanized rubber insulation, without sacrifice of any of the desirable properties of vulcanized rubber insulation. The improved conducting compound of the invention may be utilized in the manufacture of insulated electric conductors or may be utilized as a means, available independently of the manufacturing operation, for protecting vulcanized rubber insulation against the destructive influence of ozone formed as the result of corona discharge under most circumstances in which such difficulties are encountered.

I claim:

1. A conducting covering for protecting vulcanized rubber insulation against corona cutting at high voltages, comprising a textile base impregnated and covered with a rubber compound including graphite in proportion upwards of about 150% by weight on the rubber.

2. A conducting covering for protecting vulcanized rubber insulation against corona cutting at high voltages, comprising a textile base impregnated and covered with a vulcanized rubber compound including graphite in proportion upwards of about 150% by weight on the rubber.

3. A high-tension insulated electric cable, comprising a conductor and vulcanized rubber insulation thereon, and a continuously adherent conducting covering over said insulation comprising a textile base impregnated and covered with a rubber compound including graphite in proportion upwards of about 150% by weight on the rubber.

4. A high-tension electric cable, comprising a conductor and vulcanized rubber insulation thereon, a continuously adherent, flexible conducting covering over said insulation comprising a textile base impregnated and covered with a rubber compound including graphite in proportion upwards of about 150% by weight on the rubber, and a highly conducting sheath over and in direct contact with said conducting covering.

5. An electric cable insulated for voltages sufficient to produce corona discharge in air, comprising a conductor insulated substantially by vulcanized rubber insulation subject to corona cutting, a highly conductive metallic sheath surrounding said insulation and a layer of conducting rubber compound between said insulation and said sheath, said layer being vulcanized to said insulation in permanent and continuous contact therewith, and being electrically grounded to said sheath, said conducting rubber compound including graphite in proportions upwards of about 150% by weight on the rubber, whereby voltage stresses across accidental air spaces between said sheath and said conducting layer are relieved and ozone cutting is prevented.

6. An electric cable in accordance with claim 5 in which said conducting compound is reinforced by a textile base.

7. An electric cable in accordance with claim 5 in which said layer comprises a textile base impregnated and covered with said conducting rubber compound.

CHARLES R. BOGGS.